United States Patent Office 3,270,595
Patented Sept. 6, 1966

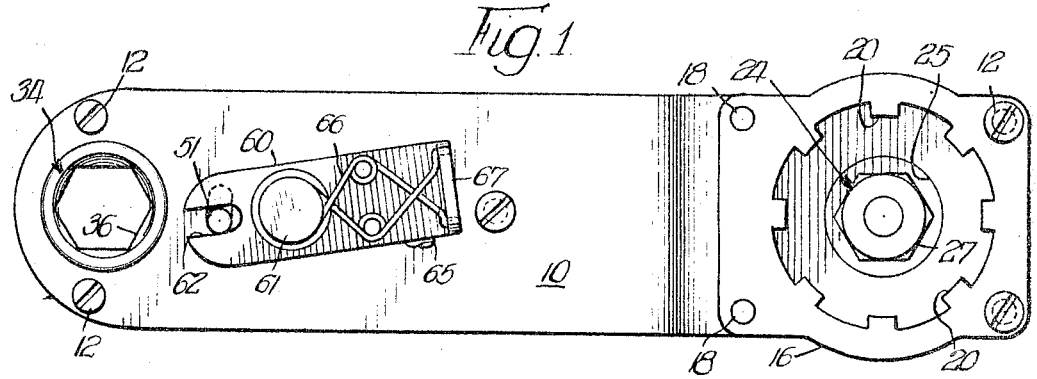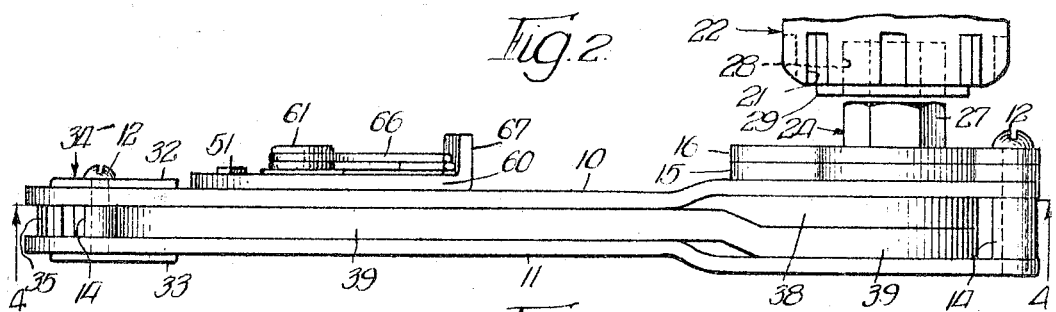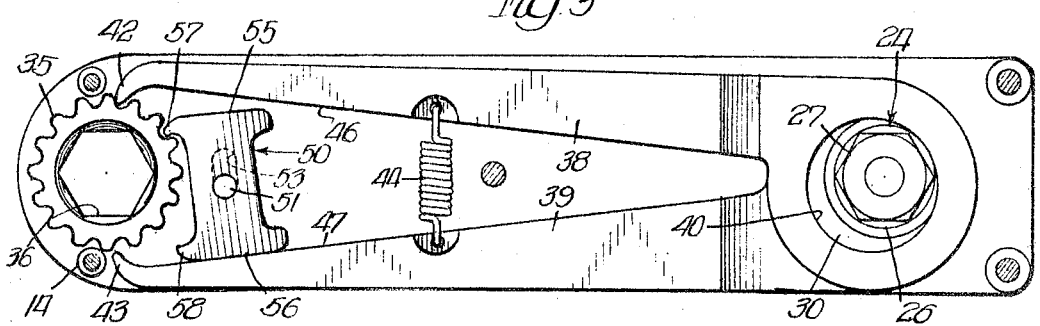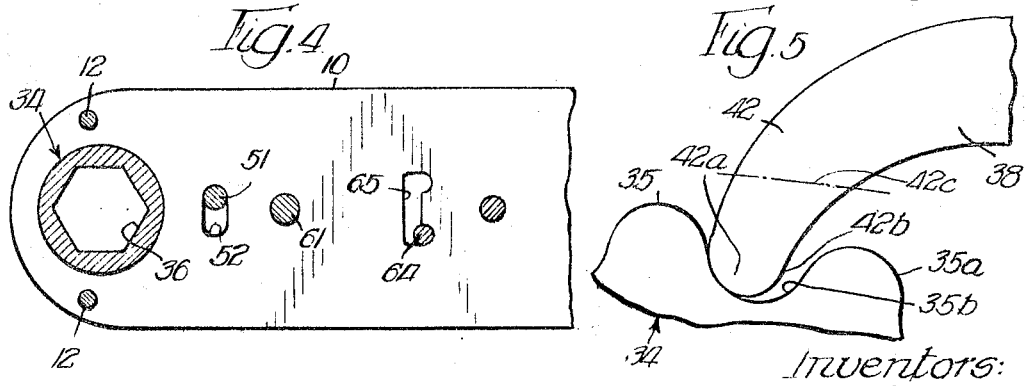

3,270,595
OFFSET DRIVE ATTACHMENT WITH
REVERSING MEANS
Emery L. Hall, Hinsdale, and John A. Blachowski, Park Ridge, Ill., assignors to Skil Corporation, Chicago, Ill., a corporation of Delaware
Filed Oct. 14, 1964, Ser. No. 403,835
8 Claims. (Cl. 81—54)

This invention relates generally to drive attachments of the type which permit running a fastener from a power tool with the latter in offset relation from the fastener, and more particularly to a new and improved drive attachment of the type which permits a fastener to be run in either direction without changing the relationship between the drive attachment and the fastener.

The present invention represents an improvement over the offset drive attachment disclosed in copending Hall et al. application, Serial No. 346,773, filed February 24, 1964. The aforementioned application has to do with a drive attachment primarily, although not exclusively, intended for use with portable power tools of the type having rotary driving members such as impact wrenches, for example. As pointed out in this copending application, it is desirable to use such tools in running fasteners used in the construction of modern-day automobile vehicles, for example, many of which fasteners are often in such confined locations in these vehicles they are inaccessible to impact wrenches and the like because of the bulk of the latter. The drive attachment of the aforementioned copending application must be removed from the fastener and flipped over to bring about a reversal of the direction of rotation of the fastener. The drive attachment which is the subject of the instant invention includes unique means to change or reverse the direction of rotation of the fastener without separating or removing the drive attachment from the fastener being run.

It is a primary object of the present invention to provide a new and improved drive attachment which includes unique pawl construction for reversing the direction of rotation of the output member of the attachment and thereby reversing the direction of rotation of the fastener being run.

Another object of the present invention is the provision of a new and improved drive attachment which includes a pair of drive pawls and a dual action stop pawl which may be selectively positioned alternately to block one of the drive pawls and cooperate with the other for rotating the output member in one direction and to block the other drive pawl and cooperate with the first mentioned drive pawl for rotating the output member in the other direction.

Still another object of the present invention is the provision of a new and improved drive attachment which includes resilient means connected with both drive pawls for urging them in engagement with the toothed member, which resilient means also cooperate with the blocked drive pawl and the stop pawl for rockably urging the latter in engagement with the toothed output member.

These and other objects and advantages of the invention will become apparent from the following specification disclosing a preferred embodiment of the invention which is illustrated in the accompanying drawing.

In the drawing:

FIG. 1 is a top plan view of the drive attachment of this invention;

FIG. 2 is a side elevational view of the drive attachment and a fragmentary portion of the nose of a power tool;

FIG. 3 is a top plan view of the drive attachment with the top plate of the same removed for illustration of the pawl construction;

FIG. 4 is a section taken along line 4—4 of FIG. 2; and

FIG. 5 is an enlarged, fragmentary plan view of the tip of one of the drive pawls and the teeth of the output member.

Now referring to the drawings, the offset drive attachment of this invention includes an elongated body primarily formed by upper and lower plates 10 and 11, respectively, secured together in spaced relation by a plurality of fasteners 12 associated with spacer sleeves 14. As noted in FIG. 2, plates 10 and 11, which are of the same shape, are stepped intermediate the ends thereof. Two identical subplates 15 and 16 are secured to the upper surface of plate 10 at one end thereof by the fasteners 12 and by additional fasteners 18. These subplates have central openings including a plurality of inwardly extending lugs 20 adapted to be received in complementary recesses 21 formed around the nose of a power tool 22 for preventing relative rotation between the attachment and the power tool when the latter is conneced with the attachment for powering the same. This connection between the drive attachment and the nose of the power tool, which forms no part of the present invention, is more fully disclosed and explained in the copending Hall et al. application mentioned above. It should be mentioned that fasteners 18 do not extend completely through the body of the attachment but terminate flush with the undersurface of upper plate 10 so as not to interfere with the drive pawls as will be apparent below.

Plates 10 and 11 include aligned bores rotatably receiving respective annular bearing surfaces of a driven member 24. The bore in plate 10 is shown in FIG. 1 and designated 25. One of the annular bearing surfaces of the driven member is shown in FIG. 3 and designated 26. In other words, driven member 24 is rotatably in one end of the body of the drive attachment for rotation about an axis transverse to plates 10 and 11. Driven member 24 includes a hexagonal extension 27 at one end thereof, which extension is adapted to be non-rotatably received in a complementary shaped driving socket 28 in the rotary driving member 29 of power tool 22. Driven member 24 includes a cylindrical cam portion 30 which is eccentric with respect to the axis of rotation of the driven member. Cam portion 30 extends axially of the driven member for a distance just slightly less than the distance between the inner surfaces of plates 10 and 11. In other words, during rotation of driven member 24, cam portion 30 travels in its path of rotation between plates 10 and 11 and about the axis of rotation of the driven member.

Plates 10 and 11 include suitably aligned bores in the ends thereof remote from the driven member, which bores rotatably receive annular bearing surfaces 32 and 33 of a cylindrical output member 34. In other words, output member 34 is rotatably mounted in plates 10 and 12 for rotation about an axis perpendicular to plates 10 and 11. Output member 34 includes an exterior annular series of teeth 35 between the annular bearing surfaces 32 and 33. The axial extent of teeth 35 is slightly less than the spacing between the inner surfaces of plates 10 and 11 thereby to permit free rotation of the output member in the body of the attachment. Driven member 34 includes a hexagonal through opening 36 for non-rotatable engagement with either a complementary shaped fastener or fastener adaptor.

The drive attachment of this invention further includes a pair of identical drive pawls 38 and 39. As noted in FIG. 3, drive pawl 38 includes an enlarged end having a bore 40 therein, which bore rotatably receives the upper half of cam portion 30. Drive pawl 39, which is turned over and has its enlarged end mounted beneath drive pawl 38, also includes a bore rotatably receiving the lower half of cam portion 30. Drive pawls 38 and 39 are both stepped intermediate their ends so that their elongated ends extend in generally juxtaposed, coplanar relation between the closer together areas of plates 10 and 11. The thickness of pawls 38 and 39 is slightly less than the distance between plates 10 and 11 at the ends of the latter adjacent the output member to permit free sliding movement of the drive pawls between plates 10 and 11.

Pawls 38 and 39 have inwardly extending driving ends or tips 42 and 43, respectively, for engagement with the teeth 35 of output member 34. A coil spring 44 includes hooked portions at its opposite ends received in suitable openings in drive pawls 38 and 39 for urging the driving ends of the latter in engagement with the teeth of the output member. It will be noted that the drive pawls 38 and 39 include generally diverging, inner planar surfaces 46 and 47, respectively. These planar surfaces alternately cooperate with the stop pawl as will be explained hereinbelow.

A dual action stop pawl 50 is pivotally and slidably or shiftably carried between plates 10 and 11 and between drive pawls 38 and 39. Stop pawl 50 includes a transversely extending pin 51 having its opposite ends received in elongated slots 52 and 53 formed in and extending transversely of respective plates 10 and 11. Stop pawl 50 further includes generally oppositely extending planar faces 55 and 56 and integral teeth engaging projections 57 and 58 adjacent respective faces 55 and 56.

When stop pawl 50 is in the position illustrated in FIG. 3, i.e. when pin 51 is at the bottom ends of slots 52, 53 as seen in FIG. 3, face 56 of the stop pawl is in substantial coextensive contact with a portion of planar surface 47 of drive pawl 39. This engagement between the stop pawl and drive pawl 39 holds stop pawl projection 57 in engagement with teeth 35 of the output member and permits the stop pawl to rock about the axis of pin 51 upon rotation of the output member in a counterclockwise direction as viewed in FIG. 3. This operation is as follows: When the stop pawl is in the position indicated in FIG. 3, upon rotation of driven member 24 stop pawl 38 oscillates to advance the output member in a counterclock wise direction, and projection 57 of the stop pawl acts to prevent retrograde movement of the output member during oscillation of pawl 38. During counterclockwise rotation of the output member by pawl 38, the stop pawl 50 is permitted to rock so that projection 57 permits teeth 35 to advance since spring 44 yieldably holds planar surface 47 in contact with face 56 of the stop pawl. Spring biased pawl 39 through the flush contact between planar surface 47 and face 56 rocks the stop pawl so that the projection 57 engages successive teeth to prevent retrograde movement of the output member upon oscillation of drive pawl 38. It will be noted that when the stop pawl is in the position illustrated in FIG. 3, its engagement with drive pawl 39 acts to block or hold its driving end 43 out of engagement with teeth 35 so as not to interfere with counterclockwise rotation of the output member.

It should be apparent that when the stop pawl is shifted to its position wherein pin 51 engages the upper ends of slots 52 and 53, end face 55 engages planar surface 46 of stop pawl 38 for blocking or holding the driving end of the latter out of engagement with the teeth of the output member and at the same time projection 58 cooperates with the driving end of drive pawl 39 so that upon rotation of driven member 24 the output member 34 is rotated in a clockwise direction as viewed in FIG. 3. In other words, shifting of stop pawl 50 acts to reverse the direction of rotation of output member 34 and accordingly the direction of a fastener driven thereby.

Means are provided to shift the stop pawl and lock the same in either of its two positions mentioned above. Such means include a lever 60 pivotally and slidably mounted on a pin 61 secured to top plate 10. Lever 60 includes an open ended slot 62 in one end thereof, which slot receives one end of pin 51. Lever 60 includes a small pin 64 secured thereto on its underside, which pin is received in a generally U-shaped slot 65 formed in upper plate 10. A spring 66 having a coil portion encircling an enlarged head of pin 61 and having its ends received in small openings in a finger gripping tip 67 of lever 60 constantly urges the latter to the right as seen in the figures. It will be apparent that as lever 60 is moved against spring 66 so that pin 64 is moved from one end of slot 65 to the other end thereof, pin 51 will be unlocked from one end of both slots 52 and 53, and moved and locked in the other end of both slots 52 and 53, thereby to shift the drive pawl from one position to the other position thereof. In other words, actuation of lever 60 as just described positions the pawls for changing the direction of rotation of output member 34.

Referring to FIG. 5, tip 42 of drive pawl 38 includes a rounded portion 42a; this tip is co-planar and angularly offset with respect to the pawl thereby to define a concave surface 42b. Teeth 35 of output member 34 have rounded tips 35a and define rounded recesses 35b between adjacent teeth. The curvature of the teeth and rounded end 42a of the drive pawl are complementary to provide the greatest possible area of contact thereby to prevent the development of stress concentrations in either the tip of the pawl or the teeth of the output member. The angular offset of tip 42 relative to drive pawl 38 is such that after pawl 38 has moved through a full driving stroke with rounded end 42a in engagement with one of the teeth 35, concave surface 42b just clears the rounded tip 35a of the adjacent successive tooth, i.e. the next tooth to be engaged.

It is desirable to maintain the angular offset of tip 42 at a minium to prevent the development of high stresses in the tip due to bending and shear along planes generally parallel and adjacent to a plane represented by phantom line 42c. Of course, as just pointed out above, this angular offset of the tip must be sufficient to provide clearance between concave surface 42b and the rounded tip of the next tooth to be engaged by the tip of the drive pawl. Accordingly, it will be apparent that the design of the tip of the drive pawl and the teeth of the output member is important for proper and reliable operation of the attachment.

It should be pointed out that the curvature of rounded end 42a of the tip and the teeth of the output member may be such that the tip of the drive pawl will kick-out when the resistance to rotation of the output member reaches a certain value. This construction adapts the offset drive attachment to act as a torque limiting device.

As mentioned above, both drive pawls are of identical construction; therefore, tip 43 of drive pawl 39 is identical with tip 42 of drive pawl 38.

Thus it will be seen that the drive attachment of this invention includes unique but simple means for changing the direction of rotation of the output mmeber, and accordingly the direction of rotation of the fastener being run, without removing or otherwise changing the relationship between the attachment and the fastener.

While the invention has been shown in but one form, it will be obvious to those skilled in the art that it is not to be so limited. On the contrary, the invention is susceptible of various changes and modifications without departing from the spirit and scope of the appended claims.

We claim:
1. In an offset drive attachment of the type having a driven cam member rotatably mounted in one end thereof and a toothed output member rotatably mounted in the other end thereof, the improvement which comprises, a pair of generally juxtaposed drive pawls each connected to the driven member for being oscillated upon rotation of the latter, one of said drive pawls being arranged and adapted to engage the teeth of the output member for rotating the same in one direction and the other drive pawl being arranged and adapted to engage the teeth of the output member for rotating the same in the other direction, resilient means in engagement with both of the drive pawls for urging the latter into engagement with the output member teeth, a dual action stop pawl movably carried by the body between said drive pawls, said stop pawl being movable in one position wherein simultaneously it engages said other drive pawl and the teeth of the output member to block the former and to prevent retrograde movement of the latter upon oscillation of said one drive pawl, and said stop pawl being movable to another position wherein it simultaneously engages said one drive pawl and the teeth of the output member to block the former and to prevent retrograde movement of the latter upon oscillation of said other drive pawl, whereby the direction of rotation of the output member may be reversed by positioning said stop pawl.

2. The drive attachment according to claim 1 wherein the resilient means serves both to hold the selected drive pawl in engagement with the output member teeth and rockably to hold the stop pawl in engagement with the output member teeth by means of the engagement between the stop pawl and the blocked drive pawl.

3. In an offset drive attachment of the type having an elongated body with a driven member rotatably mounted in one end thereof and a cylindrical output member rotatably mounted in the other end thereof, which output member includes an exterior annular series of teeth, the improvement which comprises a pair of drive pawls each connected to said driven member by cam means so that both pawls are oscillated upon rotation of the driven member, said drive pawls being arranged and adapted for engagement with said teeth so that upon their oscillation one of the drive pawls is operable to rotate the output member in one direction and the other drive pawl is operable to rotate the output member in the opposite direction, resilient means urging both drive pawls into engagement with the teeth, a dual action stop pawl movably mounted on said body between said drive pawls, said stop pawl being movable to one position in which it engages said other pawl for holding the latter out of engagement with the teeth and the same time engages said teeth to cooperate with said first drive pawl to rotate the output member in said one direction, and said stop pawl being movable to a second position in which it engages said one drive pawl to hold the latter out of engagement with the teeth and at the same time engages the ratchet teeth for cooprating with said other drive pawl to rotate the output member in said opposite direction.

4. In an offset drive attachment of the type having an elongated body with a driven member rotatably mounted in one end thereof and a cylindrical output member rotatably mounted in the other end thereof, which output member includes an annular series of ratchet teeth extending around its exterior, the improvement which comprises, a pair of drive pawls each connected with said driven member for being oscillated upon rotation of the latter, said drive pawls being arranged to engage the ratchet teeth at generally diametrically spaced apart locations and being adapted so that one drive pawl rotates the output member in one direction and the other drive pawl rotates the output member in the other direction, spring means engaging both drive pawls for urging the latter into engagement with the ratchet teeth, a stop pawl movably mounted to said body between said drive pawls, said stop pawl being movable to a first position in which it engages said other pawl for holding the latter out of engagement with the ratchet teeth and at the same time engages the ratchet teeth to cooperate with said one pawl to rotate the output member in one direction, and said stop pawl being movable to a second position in which it engages said one drive pawl to hold the latter out of engagement with the ratchet teeth and at the same time engages the ratchet teeth to cooperate with said other drive pawl to rotate the output member in said other direction.

5. In an offset drive attachment of the type having an elongated body with a driven member rotatably mounted in one end thereof and a cylindrial output member rotatably mounted in the other end thereof, the improvement which comprises, a pair of drive pawls each connected to said driven member by cam means so that the drive pawls are oscillated upon rotation of the driven member, said output member being provided with an exterior annular series of teeth, said drive pawls having respective driving ends engageable with said ratchet teeth at generally diametrically disposed locations, one driving end being adapted upon oscillation to rotate the output member in one direction and the other driving end being adapted upon its oscillation to rotate the output member in the opposite direction, resilient means engageable with both of said drive pawls for urging the driving ends of the latter into engagement with the teeth, said drive pawls being in generally juxtaposed relation and having respective planar surfaces on their inner sides adjacent the driving ends thereof, a stop pawl movably supported on said body between said planar surfaces, said stop pawl having first and second generally opposite planar end faces and first and second teeth engaging projections associated with its respective end faces, said stop pawl being movable to one position wherein simultaneously said first face thereof abuts said planar surfaces of said other driving pawl for holding the driving end of the latter out of engagement with the ratchet teeth and said second projection thereof engages said teeth to cooperate with said one driving pawl for rotating the output member in one direction, and said stop pawl being movable to another position wherein simultaneously said second face thereof abuts said planar surface of said one driving pawl for holding the driving end of the latter out of engagement with the ratchet teeth and said first projection thereof engages said teeth to cooperate with said other driving pawl for rotating said output member in said opposite direction.

6. The drive attachment according to claim 5 wherein the engagement between one of the faces of the stop pawl and the planar surface of the associated resiliently biased drive pawl serves rockably to hold the stop pawl in engagement with the teeth of the output member.

7. In an offset drive attachment of the type having an elongated body with a driven cam member rotatably mounted in one end thereof and a cylindrical output member rotatably mounted in the other end thereof, the improvement which comprises, a pair of driving pawls each being connected with said cam member so that each pawl is oscillated upon rotation of the cam member, said output member having an external annular series of ratchet teeth, one of said pawls having a driving end disposed on one side of said output member and being adapted to engage the teeth thereof to rotate the output member in one direction upon rotation of the driving member, the other of said driving pawls having a driving end disposed generally at the other side of said output member and being adapted to engage the teeth thereof to rotate the output member in an opposite direction upon rotation of the driven member, spring means associated with both pawls for urging the driving ends of the latter into engagement with the teeth of the output member, a stop pawl member disposed between said driving pawls and shiftably supported on said body, said stop pawl being shiftable to one position in which it engages said other of the drive pawls thereby holding the driving end of the latter out of engagement with the ratchet teeth while at the same time engaging the teeth to cooperate with said one drive pawl for rotating the output member in said one direction, and said stop pawl being shiftable to another position in which it engages said one of the drive pawls thereby holding the driving end of the latter out of engagement with the ratchet teeth while at the same time engaging the ratchet teeth to cooperate with said other drive pawl for rotating the output member in said opposite direction.

8. The improvement according to claim 7 wherein said teeth are rounded at their tips and define rounded recesses between adjacent teeth, and wherein each drive pawl has its driving end defined by a rounded co-planar tip angularly disposed to the pawl thereby to define a concave surface, said tip being configured so that after it has engaged and driven a tooth through a full driving stroke of movement of the associated drive pawl said concave surface just clears the rounded tip of the adjacent successive tooth.

References Cited by the Examiner

UNITED STATES PATENTS

| | | | |
|---|---|---|---|
| 2,264,012 | 11/1941 | Wasson | 81—54 |
| 2,723,580 | 11/1955 | Brame | 81—57 |

WILLIAM FELDMAN, *Primary Examiner.*

J. L. JONES, JR., *Assistant Examiner.*